United States Patent [19]
Ban

[11] Patent Number: 5,506,966
[45] Date of Patent: Apr. 9, 1996

[54] SYSTEM FOR MESSAGE TRAFFIC CONTROL UTILIZING PRIORITIZED MESSAGE CHAINING FOR QUEUEING CONTROL ENSURING TRANSMISSION/RECEPTION OF HIGH PRIORITY MESSAGES

[75] Inventor: Takayuki Ban, Tokyo, Japan

[73] Assignee: NEC Corporation, Tokyo, Japan

[21] Appl. No.: 971,552

[22] Filed: Nov. 5, 1992

[30]  Foreign Application Priority Data

Dec. 17, 1991 [JP] Japan ................................. 3-333641

[51] Int. Cl.⁶ ............................................... H01J 1/00
[52] U.S. Cl. ...................... 395/250; 395/650; 364/230.1; 364/230.3; 364/239; 364/DIG. 1
[58] Field of Search ................................. 395/200, 275, 395/250, 600, 650

[56]  References Cited

U.S. PATENT DOCUMENTS 3,925,766  12/1975  Bardotti et al. ..................... 340/172.5
4,658,351   4/1987  Teng ......................................... 395/650
5,179,708   1/1993  Gyllstrom et al. ...................... 395/725
5,276,899   4/1993  Neches .................................... 395/200

OTHER PUBLICATIONS

ACOS Software Manual, "ACOS-4/MVP XE Message Control System II", 1986.

Primary Examiner—Thomas C. Lee
Assistant Examiner—Sang Hui Kim
Attorney, Agent, or Firm—Foley & Lardner

[57]  ABSTRACT

An on-line data processing system for providing a traffic control over the message queuing buffers that temporarily store the messages in order to absorb the difference in the message processing speed between the on-line program processing unit and the transmission/reception unit connected to a plurality of terminals. The traffic control is provided such that the message is stored or obtained in or from the message queuing buffer in accordance with the priority set on the messages. The priority of the messages is determined by using a character string in a predetermined position in each message.

19 Claims, 10 Drawing Sheets

FIG. 2

33 MESSAGE QUEUING BUFFER

| LINK POINTER 61 | PRIORITY 62 | SENT / RECEIVED / DATA 63 |
|---|---|---|

FIG. 3

MESSAGE QUEING BUFFER CONTROL TABLE 35

| | |
|---|---|
| 351 | QUEUING BUFFER COUNT |
| 352 | IDLE QUEUING BUFFER COUNT |
| 353 | IDLE QUEUING BUFFER HEAD POINTER |
| 354 | IDLE QUEUING BUFFER END POINTER |
| 355 | SENT MESSAGE STORAGE QUEUING BUFFER COUNT |
| 356 | SENT MESSAGE STORAGE QUEUING BUFFER HEAD POINTER |
| 357 | SENT MESSAGE STORAGE QUEUING BUFFER END POINTER |
| 358 | RECEIVED MESSAGE STORAGE QUEUING BUFFER COUNT |
| 359 | RECEIVED MESSAGE STORAGE QUEUING BUFFER HEAD POINTER |
| 35A | RECEIVED MESSAGE STORAGE QUEUING BUFFER END POINTER |

QUEUING BUFFER TRAFFIC CONTROL DATA AREA: E1, E2, ... En

FIG. 5

MESSAGE PRIORITY DEFINITION TABLE

FIG. 6

MESSAGE PRIORITY DATA

SYSTEM FOR MESSAGE TRAFFIC CONTROL UTILIZING PRIORITIZED MESSAGE CHAINING FOR QUEUEING CONTROL ENSURING TRANSMISSION/RECEPTION OF HIGH PRIORITY MESSAGES

BACKGROUND OF THE INVENTION

The present invention relates to a message traffic control in data communications with terminals. More particularly, the present invention relates to an on-line data processing system which provides traffic control over the message queuing buffers that temporarily store sent/received messages in accordance with the priority set on the messages in order to absorb the difference in the processing speed between terminals and the on-line program.

The present invention further relates to an on-line data processing system which provides traffic control over message queuing buffers in accordance with the priority set on the messages in the message queuing control for storing and fetching messages into and from the message queuing buffers to thereby ensure the transmission/reception of high priority messages even if a high load is imposed on the on-line program unit in message transmission/reception with terminals.

In on-line data processing systems having a plurality of terminals and a host computer connected via communication lines, hundreds to thousands of terminals are generally connected, and depending on the usage period, time slot, and business application, the on-line data traffic generated varies moment by moment and can, at times, exceed the processing power of the host computer. In addition to such variations in the traffic, there is a limit to the capacity and capability of communication lines such that it may not be possible to properly receive/transmit messages from/to terminals. In general, to resolve these problems and achieve a smooth system operation, buffers to temporarily store received/transmitted messages from/to terminals are implemented accordingly with the processing power of the host computer and the capacity and capability of the communication lines. And depending on the buffer usage status, traffic control is exercised to restrain messages being received from terminals by transmitting restraining messages and by following transmission control protocols as well as to restrain message transmissions to terminals by on-line programs such as business programs running on the host computer.

However, a conventional traffic control has been provided irrespective of the type and/or processing priority of messages as well as not over message queuing buffers in accordance with the priority set on messages.

Since in such a conventional traffic control system the traffic control is provided without discriminating sent/received messages with terminals in accordance with the type and processing priority of the messages, a high emergency message cannot be transmitted/received when a high load is imposed on the on-line program. Even if a transmission/reception is made, on-line data processing of that message can be delayed, disadvantageously. Especially, an on-line system which requires updating a data base, for example a banking system, can be greatly influenced by such drawbacks.

The present invention eliminates such drawbacks in the conventional techniques. It is an object of the present invention to provide a traffic control device which ensures the transmission/reception of high priority messages.

SUMMARY OF THE INVENTION

In an on-line data processing system connected to a plurality of terminals (e.g. 1a–1n) via communication lines (e.g. 2), the present invention is comprised of: transmitting/receiving means (e.g. 32) for transmitting or receiving messages to or from said terminals in accordance with predetermined transmission control protocols; processing means (e.g. 31) responsive to said messages received from one of said terminals for processing said messages, such as updating the database (e.g. 4) implemented in the on-line data processing system, and producing the resultant messages to be sent back to said terminal; storage means (e.g. 33) for temporarily storing said messages communicated between said transmitting/receiving means and said processing means; priority determination means (e.g. 36) for determining the priority of said messages; traffic control means (e.g. 34, 35) responsive to a request from said transmitting/receiving means and/or said processing means for providing a traffic control of messages communicated between said transmitting/receiving means and said processing means by storing or obtaining said message into or from said storage means in accordance with the priority of said messages determined by said priority determination means.

In an embodiment of the invention, the storage means is comprised of a plurality of buffers and the priority determination means determines the priority of the messages by using a character string in a predetermined location in the message received from or transmitted to one of the terminals.

The priority determination means includes a priority definition table having priority definition data for determining the priority of the messages, and the priority definition data are dynamically added, changed, or deleted by request from the processing means.

Storing/obtaining a message into/from the storage means in accordance with the priority of the messages is performed such that a higher priority message is done earlier or such that inhibition of transmission/reception of a higher priority message is performed later than that of a lower priority one.

It is preferable that a message is stored/obtained in/from the storage means in order of the priority. The traffic control means preferably discards the message having a predetermined priority or a priority less than the predetermined priority from the storage means according to a request from the processing means.

DETAILED DESCRIPTION

An embodiment of the present invention will be described below with reference to the drawings.

Figure 1:
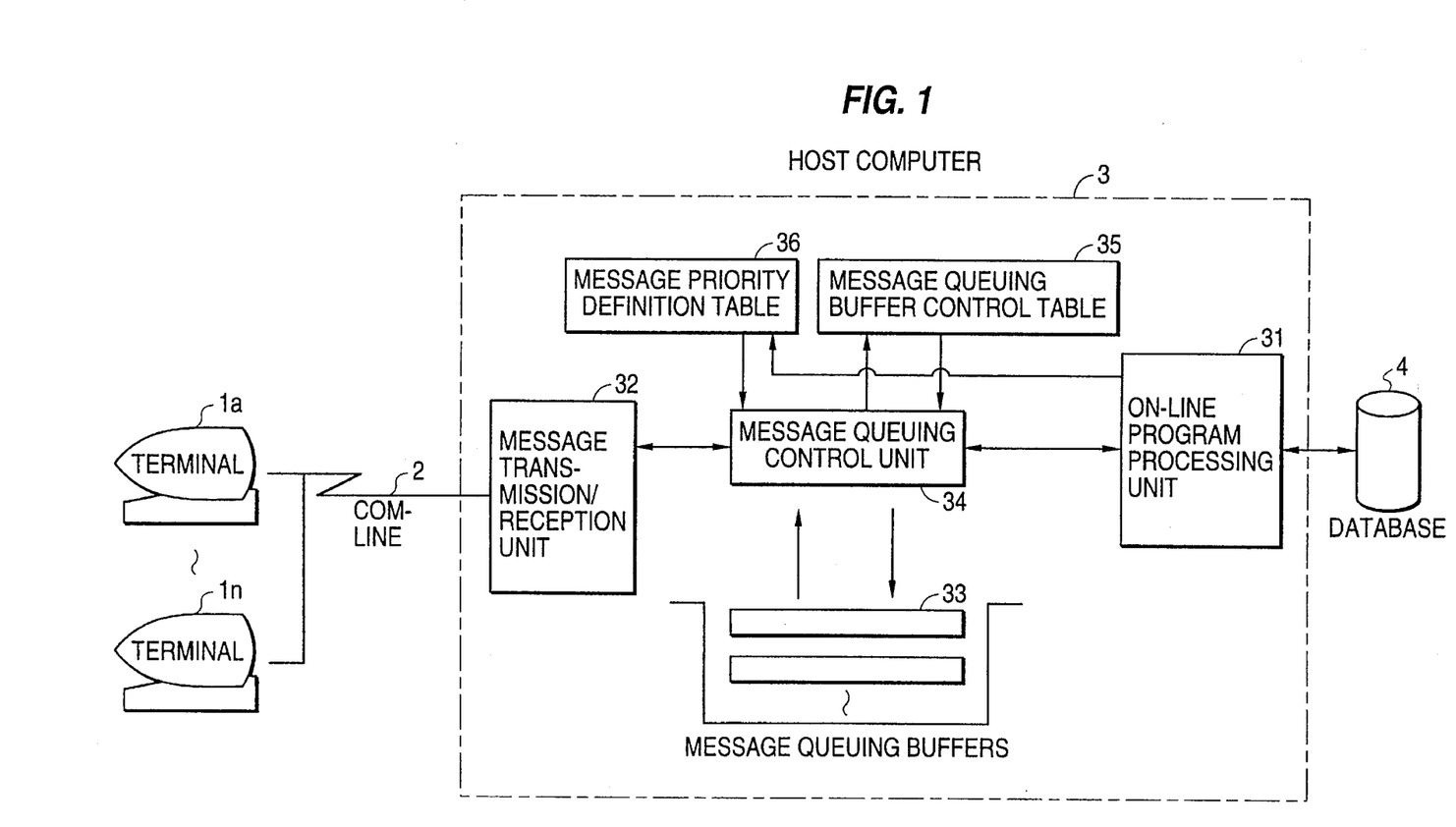
FIG. 1 is a block diagram indicative of the structure of an embodiment of an on-line data processing system according to the present invention.

Referring to FIG. 1, a plurality of terminals 1a–1n are connected to the host computer 3 via communication lines 2. The host computer 3 has an on-line program processing unit 31 for processing the messages such as updating the database 4 in response to the messages received from one of the terminals, a message transmission/reception unit 32 for transmitting and receiving messages according to predetermined transmission control protocols, and a plurality of message queuing buffers 33 for temporarily storing the messages. The message queuing buffers 33 are used for absorption of the difference in the message processing speed between the on-line program processing unit 31 and the message transmission/reception unit 32.

A message queuing control unit 34 provides a message storing/obtaining control over the message queuing buffers 33 by request from the message transmission/reception unit 32 and the on-line program processing unit 31.

A message queuing buffer control table 35 stores the total number of the message queuing buffers 33, the number of the idle ones of the message queuing buffers 33, the message reception inhibition starting point, the message reception inhibition releasing point, the message transmission inhibition starting point, and the message transmission inhibition releasing point. These points are stored corresponding to each degree of the priority. The contents of the table 35 is referenced and updated by the message queuing control unit 34 in order to provide a traffic control over the message queuing buffers 33.

A message priority definition table 36 stores the starting position in a message, the length, and the name of a character string (keyword) to identify the priority of the messages. The contents of the table 36 is referenced by the message queuing control unit 34 to determine the priority of the messages.

Figure 2:
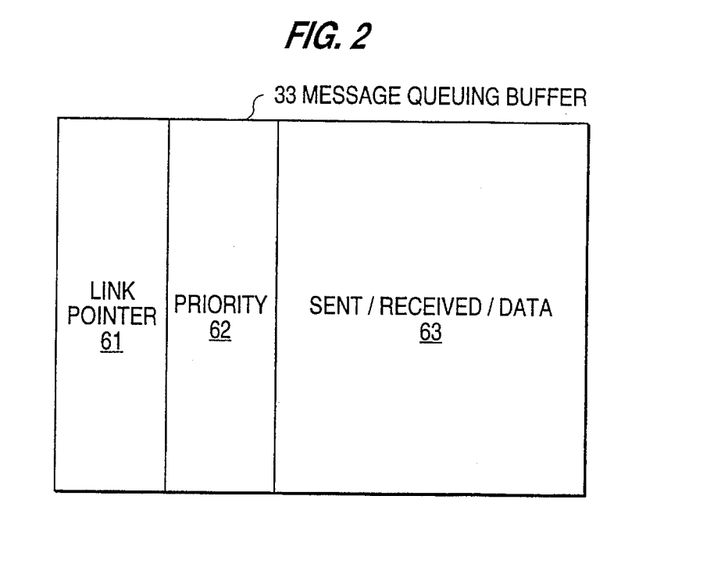
FIG. 2 illustrates the format of a message queuing buffer in the present embodiment.

Referring to FIG. 2, the message queuing buffer 33 is composed of a link pointer 61, sent/received data (message) 63 and its priority 62. The link pointer 61 is used to link message queuing buffers 33 in a chain to provide queuing control. The sent/received data 63 is the area where a sent/received message is stored. The priority 62 is the area where the priority of the sent/received message stored in the sent/received data 63 is stored.

Figure 3:
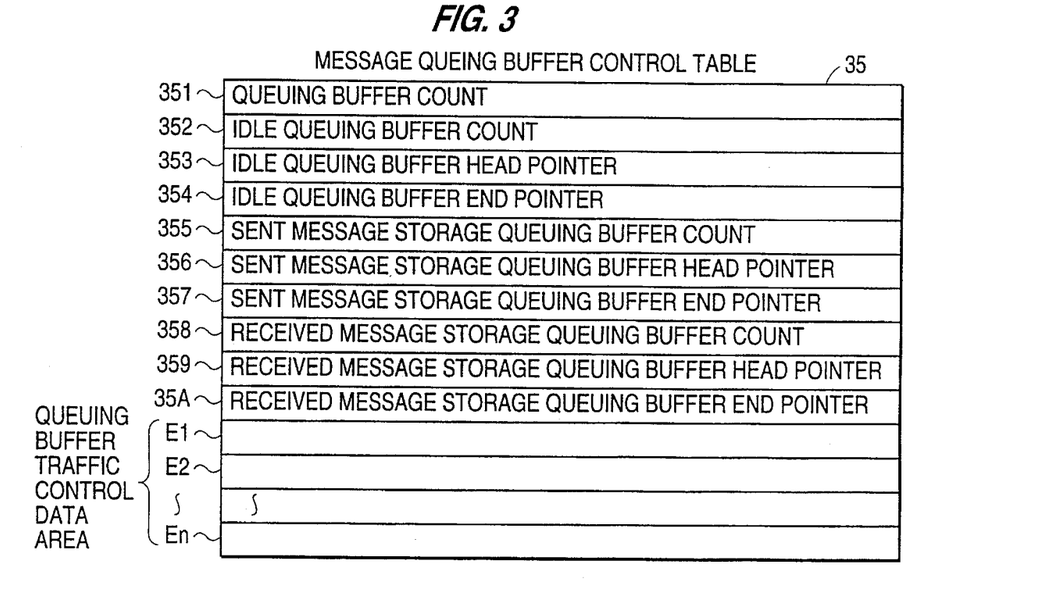
FIG. 3 shows the structure of a message queuing buffer control table in the present embodiment.

FIG. 3 illustrates the structure of a message queuing buffer control table 35 of the present embodiment. The message queuing buffer control table 35 includes a queuing buffer count 351, an idle queuing buffer count 352, an idle queuing buffer head pointer 353, an idle queuing buffer end pointer 354, a sent message storage queuing buffer count 355, a sent message storage queuing buffer head pointer 356, a sent message storage queuing buffer end pointer 357, a received message storage queuing buffer count 358, a received message storage queuing buffer head pointer 359, a received message storage queuing buffer end pointer 35A and queuing buffer traffic control data areas E1–En that are equal in number to the priorities.

The queuing buffer count 351 stores the total number of message queuing buffers built in the host computer 3. The message queuing buffer 33 is linked by its link pointer 61 with one of the transmission chain (of message queuing buffers where sent messages are stored), the received chain (of message queuing buffers where received messages are stored) or the idle chain (of message queuing buffers where no sent/received messages are stored).

The idle queuing buffer head pointer 353 stores the pointer to the message queuing buffer 33 linked the head of the idle chain. The idle queuing message buffer end pointer 354 stores the pointer to the message queuing buffer linked to the end of the idle chain. The idle queuing buffer count 352 stores the total number of message queuing buffers linked to the idle chain.

The sent message storage queuing buffer head pointer 356 stores the pointer to the message queuing buffer linked to the head of the sent chain. The sent message storage queuing buffer end pointer 357 stores the pointer to the message queuing buffer 33 linked to the end of the sent chain. The sent message storage queuing buffer count 355 stores the total number of message queuing buffers linked to the sent chain.

The received message storage queuing buffer head pointer 359 stores the pointer to the message queuing buffer 33 linked to the head of the received chain. The received message storage queuing buffer end pointer 35A stores the pointer to a message queuing buffer linked to the end of the received chain. The received message storage queuing buffer count 358 stores the total number of message queuing buffers 33 linked to the received chain.

Figure 4:
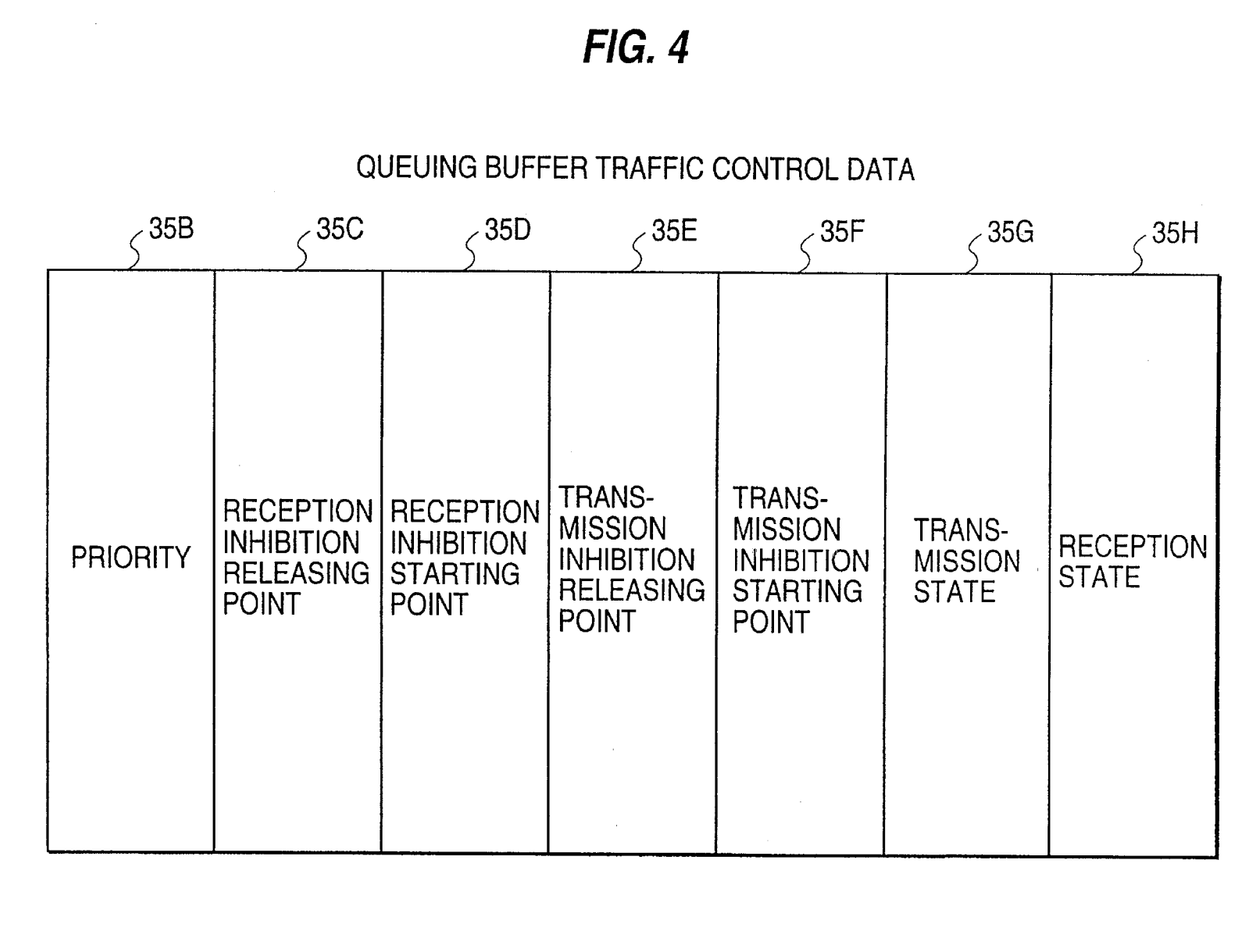
FIG. 4 illustrates the structure of a traffic control data area of a queuing buffer in the present embodiments.

FIG. 4 illustrates the structure of the traffic control data area of a queuing buffer in the present embodiment. The traffic control data area is composed of a priority 35B, a reception inhibition releasing point 35C, a reception inhibition starting point 35D, a transmission inhibition releasing point 35E, a transmission inhibition starting point 35F, a transmission state 35G and a reception state 35H.

The priority 35B stores data on the priority for queuing buffer traffic control. The reception inhibition releasing point 35C, the reception inhibition starting point 35D, the transmission inhibition releasing point 35E, and the transmission inhibition starting point 35F store an idle message queuing buffer count required for providing queuing buffer traffic control.

When the value of idle queuing buffer count 352 arrives at the reception inhibition starting point 35D, the reception state 35H goes into the "reception inhibition state" to inhibit reception. When the value is recovered to the reception inhibition releasing point 35C, the reception state 35H goes into the "reception enable state" to reopen reception. When the value of the queuing buffer count 352 arrives at the transmission inhibition starting point 35F, the transmission state 35G goes into the "transmission inhibition state" to inhibit transmission. When the value is recovered to the transmission inhibition releasing point 35E, the transmission state 35G goes into the "transmission enable state" to reopen transmission. Generally, it is set in the traffic control data area that the reception inhibition releasing point 35C>the reception inhibition starting point 35D>the transmission inhibition releasing point 35E>the transmission inhibition starting point 35F.

Figure 5:
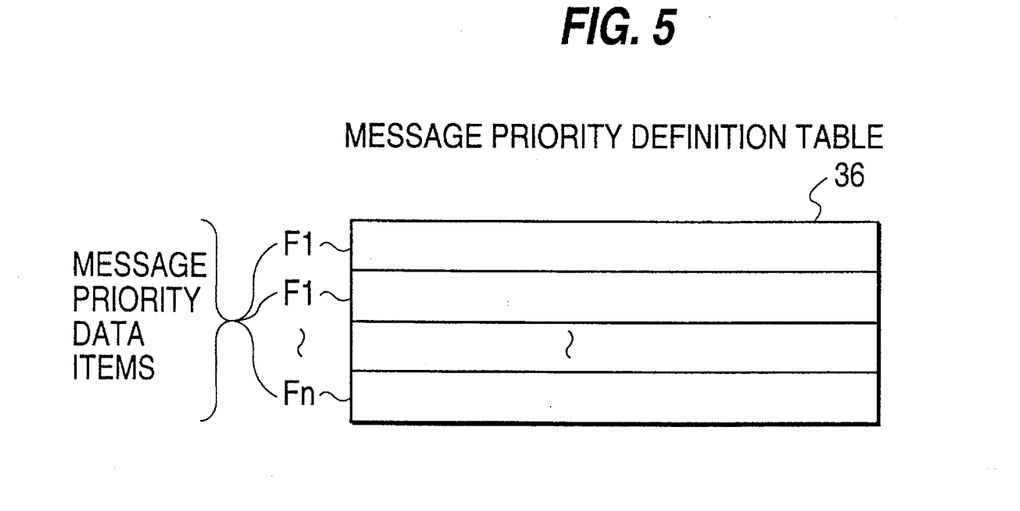
FIG. 5 illustrates the structure of a message priority definition table in the present embodiment.

FIG. 5 illustrates the structure of the message priority definition table in the present embodiment. The table 36 is composed of message priority data items F1–Fn corresponding to the number of existing priorities.

Figure 6:
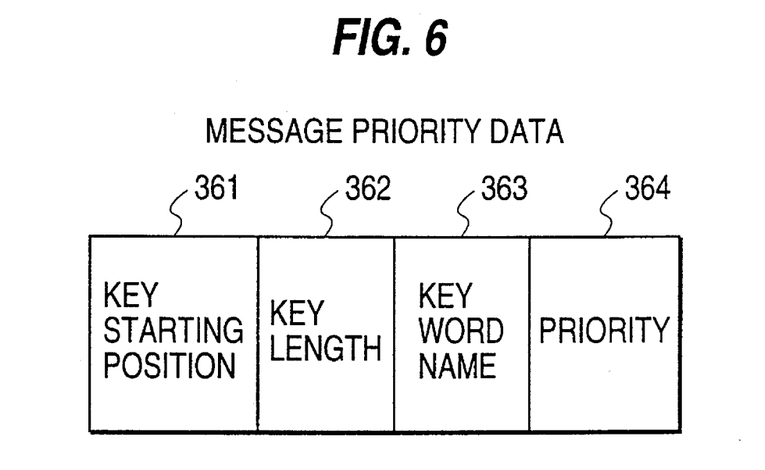
FIG. 6 illustrates the structure of message priority data in the present embodiment.

FIG. 6 illustrates the structure of the message priority data in the present embodiment. The data is composed of a key starting position 361, a key length 362, a keyword name 363, and a priority 364, and is used to determine the priority of a sent/received message. The starting position of a character string (key word) to determine the priority of the sent/received message is stored in the key starting position 361, a key length in the key length 362 and a character string (key word) in the key word name 363.

At an initial point in time such as in the system initialization, all message queuing buffers 33 in the host computer 3 are linked in a single chain by the link pointer 61 of FIG. 2. The total number of message queuing buffers 33 is stored in the queuing buffer count 351; the pointer to the head message queuing buffer 33 is stored in the idle queuing buffer head pointer 353; and the pointer to the end message queuing buffer 33 is stored in the queuing buffer end pointer 354.

The sent message storage queuing buffer count 355 and the received message storage queuing buffer count 358 each store a "0". The sent message storage queuing buffer head pointer 356, the sent message storage queuing buffer end pointer 357, the received message storage queuing buffer head pointer 359 and the received message storage queuing buffer end pointer 35A have no significant pointers stored therein.

Each of the priority 35B, the reception inhibition releasing point 35C, the reception inhibition starting point 35D, the transmission inhibition releasing point 35E and the transmission inhibition starting point 35F of the queuing buffer traffic control data areas E1–En are given values by the system generation SG. The transmission state 35G stores the "transmission enable state" while the reception state 35H stores the "reception enable state". Each of the key starting point 361, the key length 362, the key word name 363 and the priority 364 of message priority data F1–Fn are given values by the system generation SG.

FIGS. 7–12 are flow charts indicative of the received message storage process, the received message fetch process, the sent message storage process, the sent message fetch process, the message priority data update process and the queuing message discard process performed by the message queuing control unit 34, respectively.

The traffic control of the present embodiment will be described below with references to the accompanying drawings concerned. In order to simplify the explanation, assume here that one sent/received message can be stored in the corresponding message queuing buffer.

Figure 7:
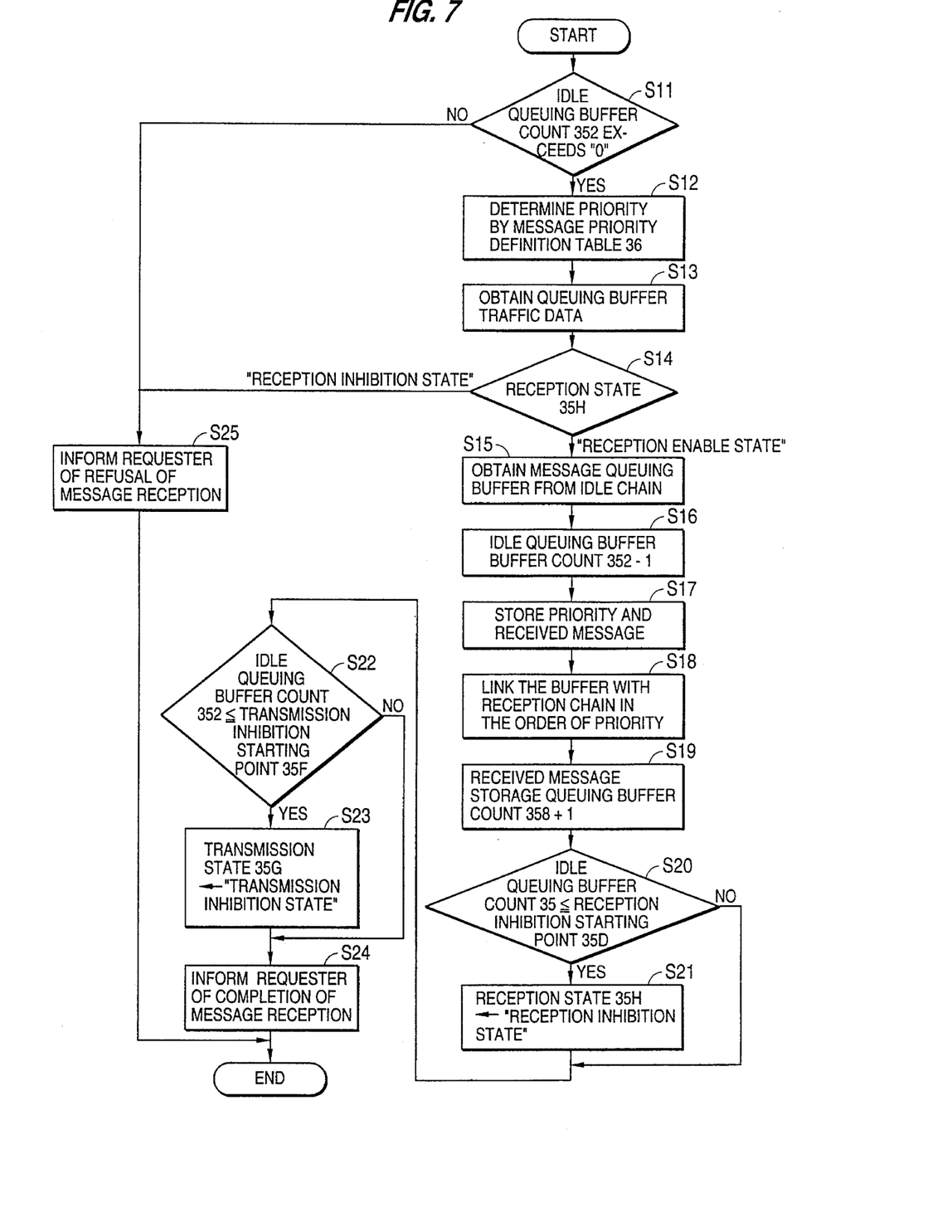
FIG. 7 is a flow chart indicative of a received message storage process performed by the message queuing control unit in the present embodiment.

The received message storage process will be described with a reference to FIG. 7.

When the message queuing control unit 34 receives from the message transmission/reception unit 32 a request for storage of a message received from one of terminals 1a–1n (hereinafter referred to as a received message) into the message queuing buffer 33, it checks whether there is an idle message queuing buffer 33 depending on whether the idle queuing buffer count 352 is greater than "0" (S11).

If there is no idle message queuing buffer to store the message (NO at S11), the message queuing control unit 34 informs the message transmission/reception unit 32 of the refusal of the message reception (S25). The message transmission/reception unit 32 informed of the refusal of the message reception refuses the received message in accordance with the transmission control protocols.

If there is an idle message queuing buffer 33 (YES at S11), the message queuing control unit 34 determines the priority by referring to the message priority data F1–Fn in the message priority definition table 36 (S12). The message queuing control unit 34 obtains the queuing buffer traffic data having the value equal to the priority as determined at step S12 from the queuing buffer traffic control data areas E1–En in the message queuing buffer control table 35 (S13) and checks whether the reception state 35H is in the "reception enable state" (S14).

If the reception state 35H is in the "reception inhibition state" as the result of the checking (NO at step S14), the message queuing control unit 34 informs the message transmission/reception unit 32 of the refusal of the message reception (S25) to accept the received message. If as the result of the checking the reception state is in the "reception enable state" (YES at S14), the message queuing control unit 34 selects one message queuing buffer 33 from the idle chain (S15) and subtracts one from the idle queuing buffer count 352 (S16).

The message queuing control unit 34 then stores the priority as determined at S12 and the received message into the message queuing buffer 33 as obtained at S15 (S17), links this buffer in the order of priority (S18), and increments the received message storage queuing buffer count 358 by one (S19). If message queuing buffers having the same priority have been already linked, the new buffer is linked to the last one of the message queuing buffers having the same priority. Since one message queuing buffer is used at the above processing steps S15–S19, the reception state 35H and transmission state 35G are updated.

If the idle queuing buffer count 352 is equal to or less than the reception inhibition starting point 35D (YES at S20), the reception state 35H is updated to the "reception inhibition state" (S21).

When the idle queuing buffer count 352 is less than or equal to the transmission inhibition starting point 35F (YES at S22), the transmission state 35G is updated with the "transmission inhibition state" (S23). Thereafter, the message queuing control unit 34 informs the message transmission/reception unit 32 of the completion of message reception (S24). When the messages transmission/reception unit 32 is informed of this data, it receives the received message in accordance with the transmission control protocols.

Figure 8:
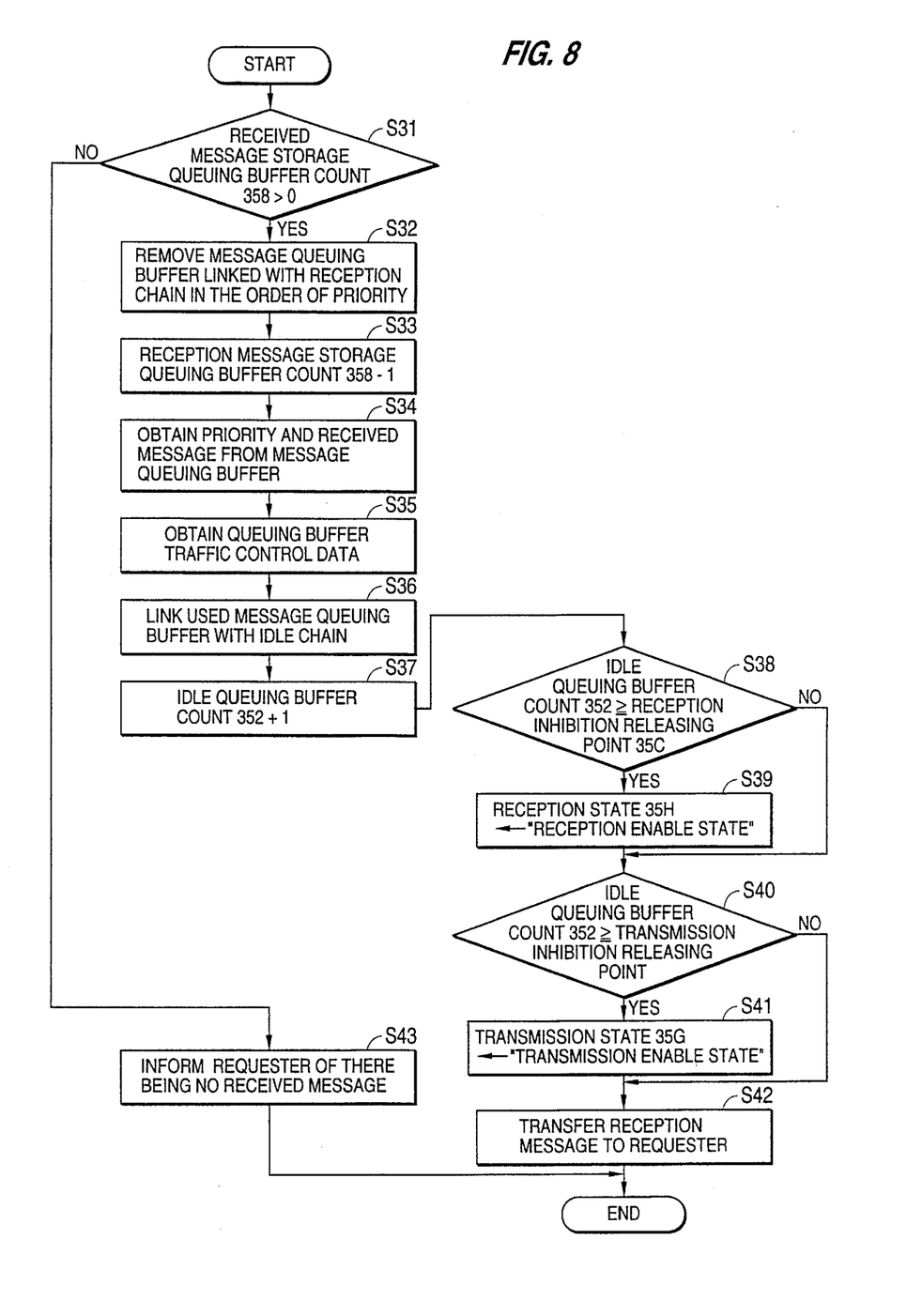
FIG. 8 is a flow chart indicative of a received message fetch process performed by the message queuing control unit in the present embodiment.

Fetching the received message will be described below with a reference to FIG. 8.

In order to obtain the received message stored in a message queuing buffer 33 by the received message storage process, the on-line program unit 31 makes a request to the message queuing control unit 34 for message reception. When the message queuing control unit 34 receives this request, it checks whether the received message storage queuing buffer count 358 is greater than "0" in order to check whether a received message is in the message queuing buffers 33 (S31).

If there are no received messages (NO at S31), the message queuing control unit 34 informs the on-line program unit 31 that there are no received messages (S43). If there is a received message (YES at S31), the message queuing control unit removes the message queuing buffer linked to the head of the reception chain (S32), decrements the received message storage queuing buffer count 358 by one (S33) and obtains the priority and the received message stored in the message queuing buffer (S34).

The message queuing control unit 34 further obtains the queuing buffer traffic data having the value equal to the priority obtained at S34 from the queuing buffer traffic data E1–En in the message queuing buffer control table 35 (S35), returns the message queuing buffer 33 used to the idle chain (S36) and increments the idle queuing buffer count 352 by one (S37).

Since the idle queuing buffer count has been incremented by one during the above processing steps S31–S37, the reception state 35H and transmission state 35G are updated. When the idle queuing buffer count 352 is greater than or equal to the reception inhibition releasing point 35C (YES at S38), the message queuing control unit 34 updates the reception state 35H to the "reception enable state" (S39). Furthermore, if the idle queuing buffer count 352 is greater than or equal to the transmission inhibition releasing point 35E (YES at S40), the message queuing control unit 34 updates the transmission state 35G to the "transmission enable state". Thereafter, it transfers the received message to the on-line program unit 31 (S42).

Figure 9:
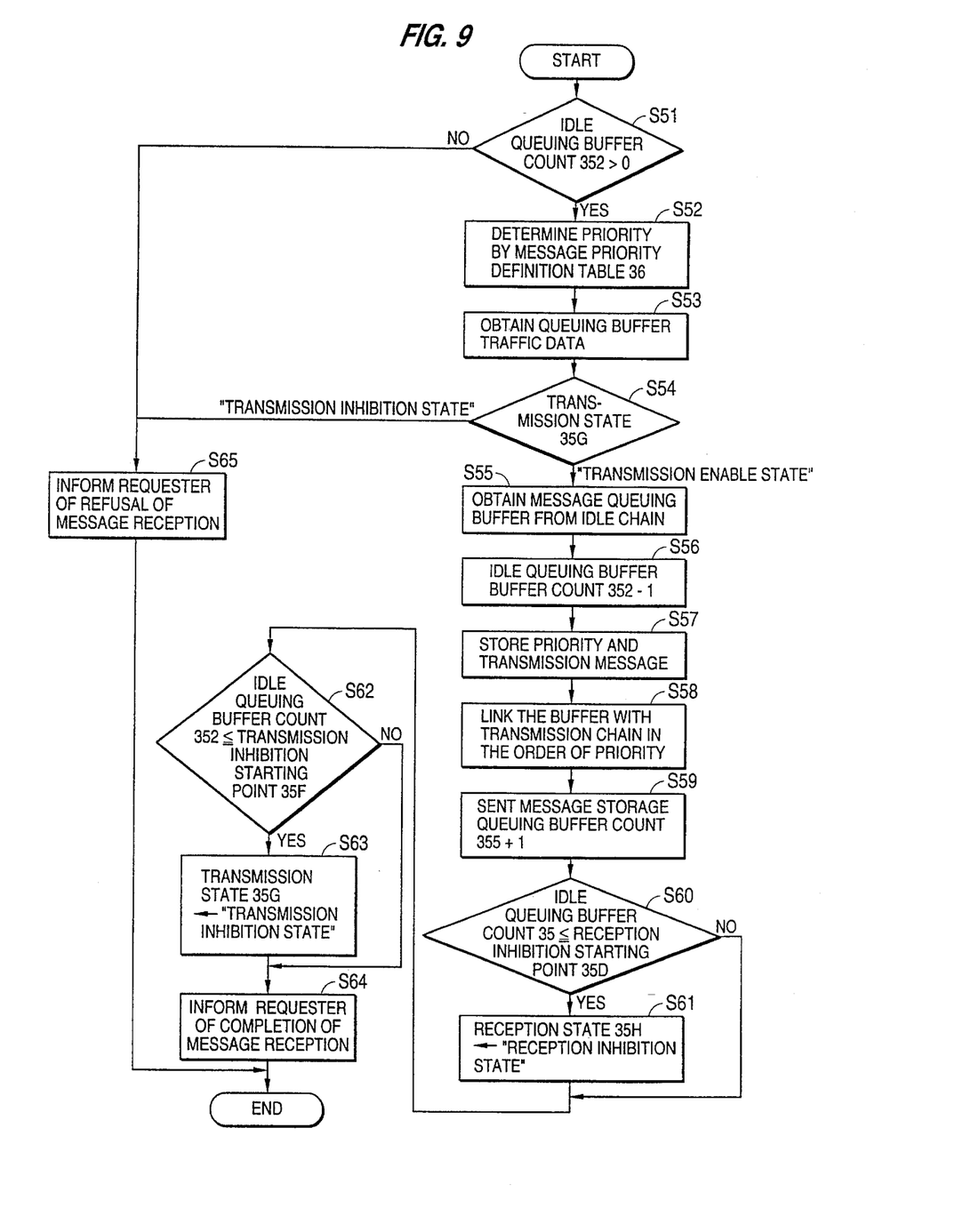
FIG. 9 is a flow chart indicative of a sent message storage process performed by the message queuing control unit in the present embodiment.

The transmission message storage process will be described below with a reference to FIG. 9.

The message queuing control unit 34 receives from the on-line program unit 31 a request for a storage of a message to be sent to one of the terminals 1a–1n (hereinafter referred to as a sent message) into the message queuing buffer and checks whether there is an idle message queuing buffer depending on whether the idle queuing buffer count 352 is greater than "0" (S51). If not (NO at S51), the message queuing control unit informs the on-line program unit 31 of the refusal of the message reception (S65).

If there is a message queuing buffer for storage (YES at S51), the message queuing control unit 34 determines the priority of the message by referring to the message priority data F1–Fn in the message priority definition table 36 (S52). The message queuing control unit 34 obtains the queuing buffer traffic control data having the value equal to the priority determined at S52 from the queuing buffer traffic control data areas E1–En in the message queuing buffer control table 35 (S53), and checks whether the transmission state 35G is in the "transmission enable state" (S54).

If the transmission state 35G is in the "transmission inhibition state" as the result of the checking (NO at S54), the message queuing control unit 34 informs the on-line program unit 31 of the refusal of the message reception (S65). If the transmission state is in the "transmission enable state" as the result of the checking (YES at S54), the message queuing control unit 34 obtains one message queuing buffer from the idle chain (S55) and decrements the idle queuing buffer count 352 by one (S56). The message queuing control unit 34 stores the priority determined at S52 and the received message in the message queuing buffer obtained at S15 (S57) and links the buffer to the transmission chain in the order of priority (S58) and increments by one the sent message storage queuing buffer count 355 (S59).

If message queuing buffers having the same priority have been already linked, the new buffer is linked to the last one of the message queuing buffers having the same priority. Since one of the message queuing buffers is used during the processing steps S55–S59, the reception state 35H and transmission state 35G are updated. When the idle queuing buffer count 352 is less than or equal to the reception inhibition starting point 35D (YES at S60), the reception state 35H is updated to the "reception inhibition state" (S61). Furthermore, if the idle queuing buffer count 352 is less than the transmission inhibition starting point 35F (YES at S62), the transmission state 35G is updated to the "transmission inhibition state" (S63). Thereafter, the message queuing control unit informs the on-line program unit 31 of the completion of the message reception (S64).

Figure 10:
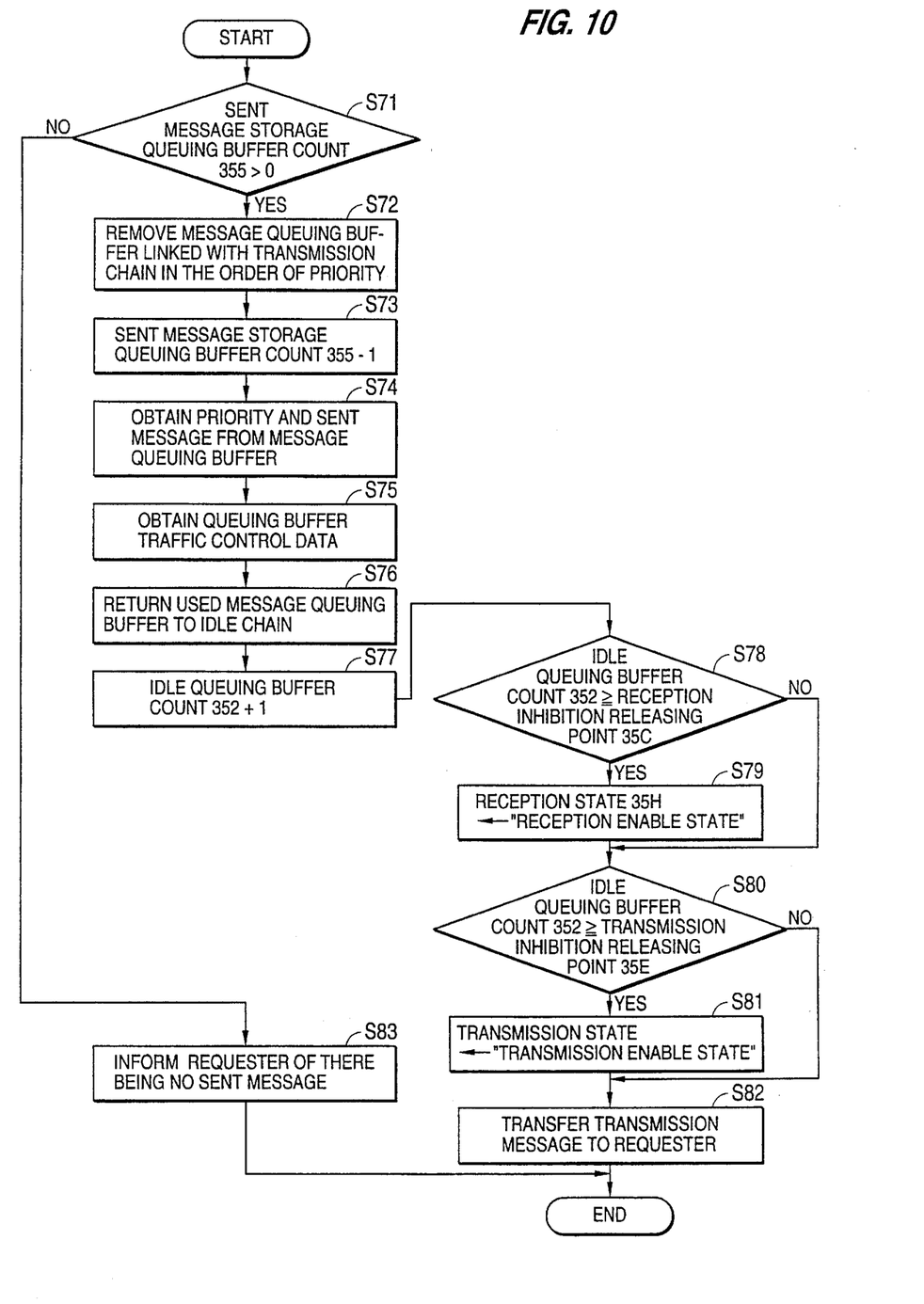
FIG. 10 is a flow chart indicative of a sent message fetch process performed by the message queuing control unit in the present embodiment.

The sent message fetch process will be described below with a reference to FIG. 10.

In order to send the sent message stored in the message queuing buffer 33 to one of the terminals 1a–1n by the sent message storage process, the message transmission/reception unit 32 informs the message queuing control unit 34 of a request for an acquisition of the message. When the message queuing control unit 34 receives this request, it checks whether the sent message storage queuing buffer count 355 is greater than "0" in order to check whether a sent message is in the message queuing buffer 33 (S71).

If there is no sent message (NO at S71), the message queuing control unit 34 informs the message transmission/ reception unit 32 that there is no sent message (S83). If there is a sent message (YES at S71), it removes the message queuing buffer linked to the head of the transmission chain (S72), simultaneously decrements the sent message storage queuing buffer count 355 by one (S73) and obtains the priority and the sent message stored in the message queuing buffer 33 (S74).

The message queuing control unit 34 obtains queuing buffer traffic control data having the value equal to the priority obtained at S74 from the queuing buffer traffic control data E1–En in the message queuing buffer control table 35 (S75), returns the message queuing buffer used to the idle chain (S76) and increments the idle queuing buffer count 352 by one (S77).

Since the idle queuing buffer count 352 has been incremented by one during the processing steps S71–S77, the reception state 35H and transmission state 35G are updated. When the idle queuing buffer count 352 is greater than or equal to the reception inhibition releasing point 35C (YES at S78), the reception state 35H is updated to the "reception enable state" (S79). In addition, if the idle queuing buffer count 352 is greater than or equal to the transmission inhibition releasing point 35E (YES at S80), the transmission state 35G is updated to the "transmission enable state" (S81).

Thereafter, the message queuing control unit 34 transfers the sent message to the message transmission/reception unit 32 (S82). The message transmission/reception unit 32 sends the message to one of the terminals 1a–1n in accordance with transmission control protocols. This message fetching process is repeated until the sent message storage queuing buffer count 355 becomes 0.

Figure 11:
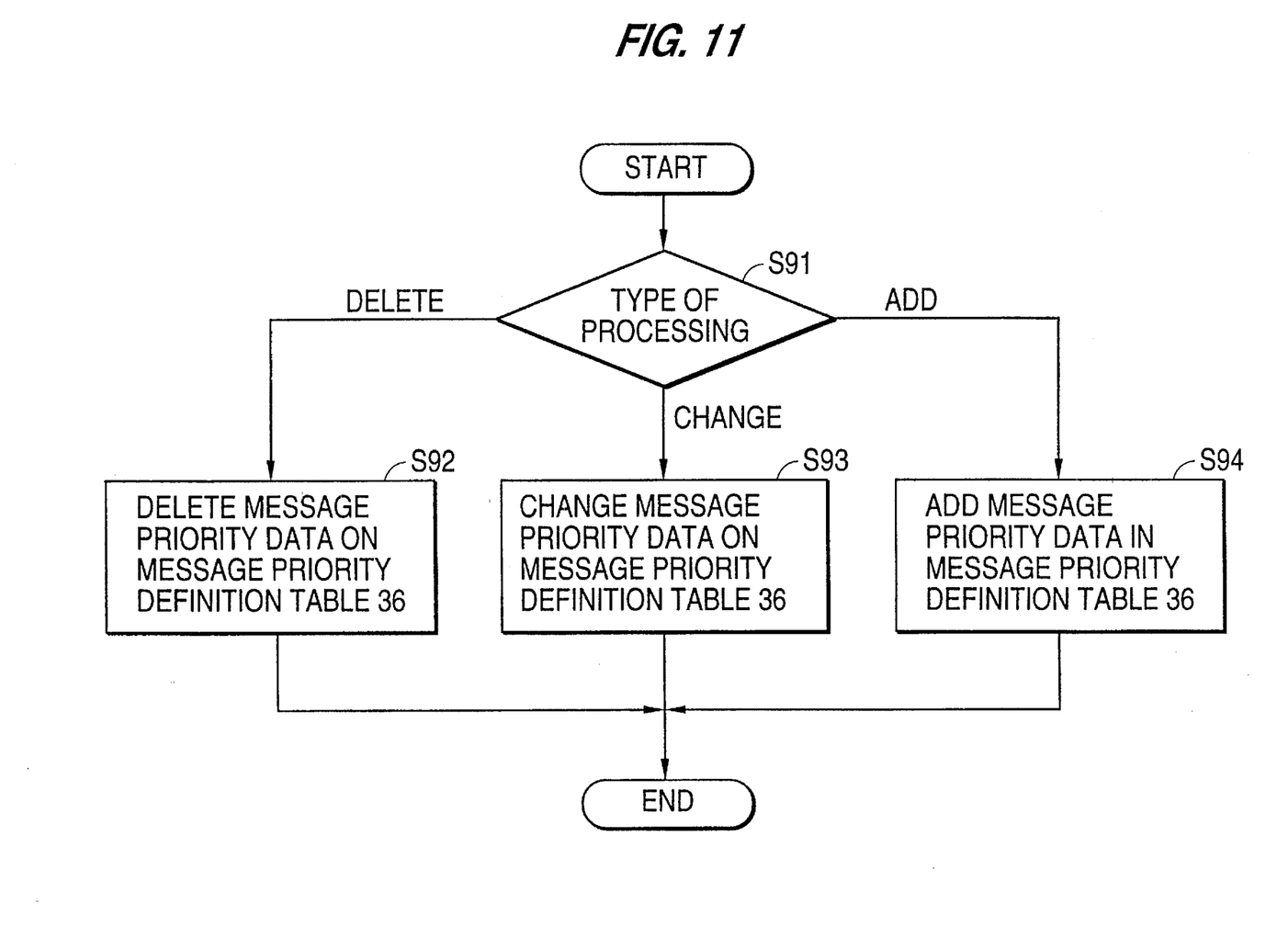
FIG. 11 is a flow chart indicative of a message priority data update process performed by the message queuing control unit in the present embodiment.

Next, the message priority data updating process will be described with a reference to FIG. 11.

When there is a need for an addition, a change, or a deletion of a message priority data in the message transmission/reception with one of the terminals 1a–1n, the on-line program unit 31 can make a request for such matter to the message queuing control unit 34.

When the message queuing control unit 34 receives a request for a deletion (deletion at S91), it deletes from the message priority definition table 36 the message priority data with the value of the priority 364 equal to the designated priority in the message priority data F1–Fn (S92). If the request is for a change of the message priority data (change at S91), the priority 364 of the message priority data that has the value of priority designated in the message priority data F1–Fn is changed to a designated value (S93). If the request is for an addition (addition at S91), message priority data as designated on the message priority definition table 36 (the key starting position 361, the key length 362, the key word name 363 and the priority 364) are added (S94).

If the request is for a deletion (deletion at S91) or for a change of the message priority data (change at S91), and the sent/received message having the priority has already been linked to either the transmission chain or the reception chain, the sent/received message may be discarded or rearranged in accordance with the priority, respectively.

Figure 12:
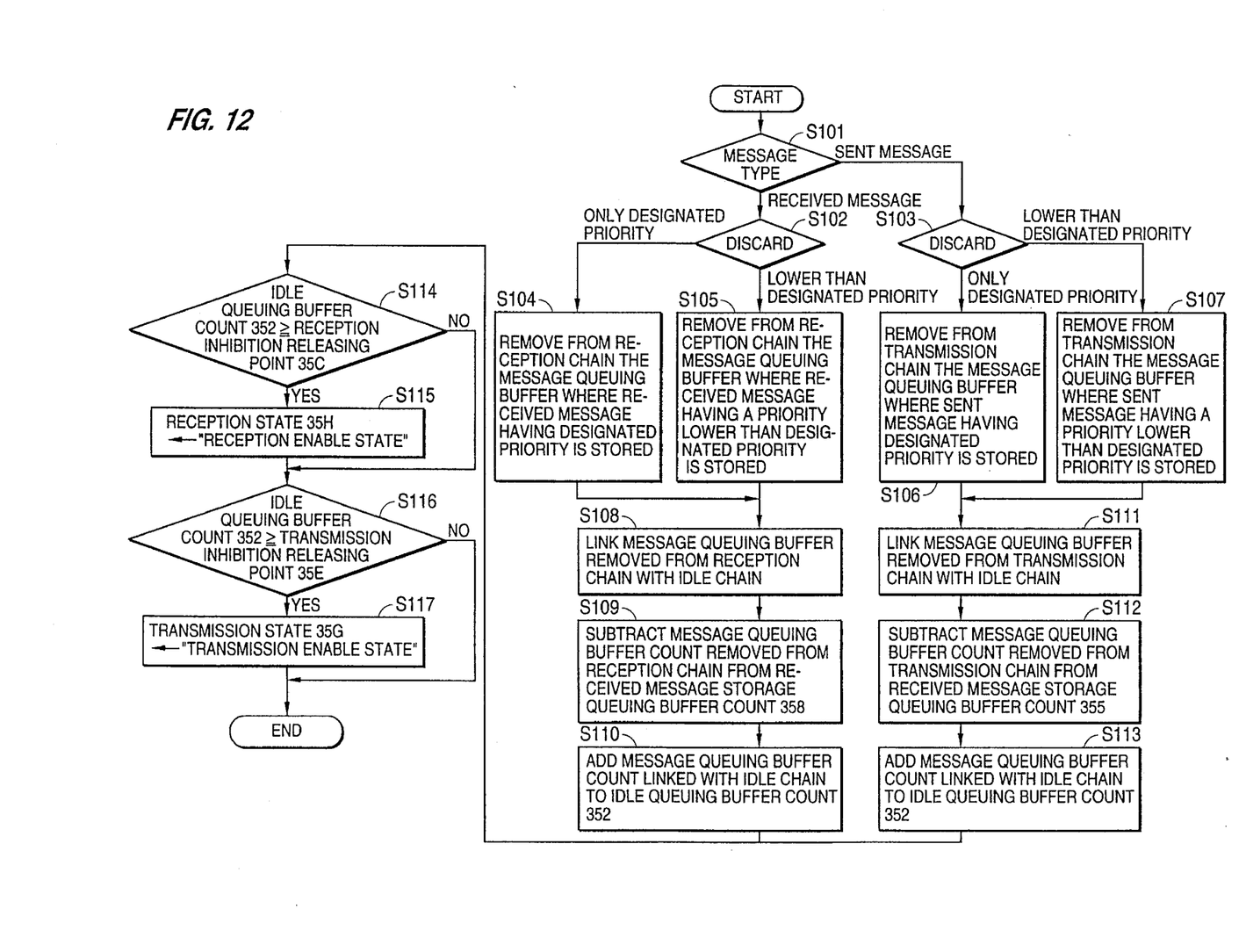
FIG. 12 is a flow chart indicative of a queuing message discard process performed by the message queuing control unit in the present embodiment.

The queuing message discarding process will be described below with a reference to FIG. 12.

When the on-line program unit 31 has sent/received a message having a high priority and no longer requires a lower priority message stored either in the transmission chain or in the reception chain, it makes a request for a discard to the message queuing control unit 34 to thereby discard the lower priority message.

When the message queuing control unit 34 receives a request for a discard, it determines whether the type of the message is a sent message or a received message (S101), and further checks whether "only the messages having the designated priority" or "the messages having a priority lower than the designated priority" are to be discarded (S102, S103).

If the messages to be discarded are only the received messages having the designated priority as the result of checking (received message at S101 and having "only the designated priority" at S102), the message queuing control unit 34 removes from the reception chain the message queuing buffers 33 linked to the reception chain and having the priority as designated in the priority 62 (S104), links the buffers to the idle chain (S108), subtracts the number of message queuing buffers 33 removed from the reception chain from the received message storage queuing buffer count 358 (S109), and adds the number of message queuing buffers 33 linked to the idle chain to the idle queuing buffer count 352 (S110).

In the case of received messages having a priority lower than the designated priority (the received message at S101 and having a priority "lower than the designated priority" at S102), the message queuing control unit 34 removes from the reception chain the message queuing buffers 33 linked to the reception chain and having a priority lower than or equal to the priority designated in the priority 62 (S105), links the removed buffer to the idle chain (S108), subtracts the number of message queuing buffers 33 removed from the reception chain from the received message storage queuing buffer count 358 (S109), and adds the number of message queuing buffers 33 linked to the idle chain to the idle queuing buffer count 352 (S110).

In the case of only sent messages having the designated priority (the sent message at S101 and having "only the designated priority" at S103), the message queuing control unit 34 removes from the transmission chain the message queuing buffers 33 linked to the transmission chain and having the designated priority in the priority 62 (S106), links the removed buffers to the idle chain (S111), subtracts the number of message queuing buffers 33 removed from the transmission chain from the sent message storage queuing buffer count 355 (S112), and adds the number of message queuing buffers 33 linked to the idle chain to the idle queuing buffer count 352 (S113).

In the case of sent messages having a priority lower than the designated priority (the sent message at S101 and having a priority "lower than or equal to the designated priority" at S103), the message queuing control unit 34 removes from the transmission chain the message queuing buffers 33 linked to the transmission chain and having a priority lower than the designated priority in the priority 62 (S107), links the removed buffers to the idle chain (S111), subtracts the number of message queuing buffers 33 removed from the transmission chain from the sent message storage queuing buffer count 355 (S112), and adds the number of message queuing buffers 33 linked to the idle chain to the idle queuing buffer count 352 (S113).

Since the idle queuing buffer count 352 has increased during the above processing steps S104–S113, the reception and transmission states 35H and 35G are updated. When the idle queuing buffer count 352 is greater than or equal to the reception inhibition releasing point 35C, the determination is YES at S114 and the reception state 35H is updated to the "reception enable state" (S115). When the value of idle queuing buffer count 352 is greater than or equal to the transmission inhibition releasing point 35E (YES at S116), the transmission state 35G is updated to the "transmission enable state" (S117).

According to the present invention, as described above, a priority is provided to a transmission/reception message with terminals and the traffic control is provided over the message queuing buffers according to each set priority to thereby ensure a high priority message transmission/reception even if a high load is imposed on the on-line program.

What is claimed is:

1. An on-line data processing system connected to a plurality of terminals via communication lines, comprising:

transmitting/receiving means for transmitting and receiving messages to and from said terminals in accordance with predetermined transmission control protocols;

processing means responsive to said messages received from one of said terminals for processing said messages and producing resultant messages to be sent back to said one terminal;

storage means for temporarily storing said messages communicated between said transmitting/receiving means and said processing means, said storage means comprising a plurality of buffers for holding said messages, said plurality of buffers being assigned a priority corresponding to said messages stored therein;

priority determination means for determining said priority of said messages; and traffic control means responsive to a request from one of said transmitting/receiving means and said processing means for providing a traffic control of messages communicated between said transmitting/receiving means and said processing means by storing and obtaining said messages into and from said storage means in accordance with said priority of said messages determined by said priority determination means, said traffic control means including means for determining on a basis of a priority of one of said messages and a number of available storage buffers for storing said one of said messages, whether said one of said messages is to be stored in one of said available storage buffers, said traffic control means further including a message queuing buffer control table configured to store information related to which of said plurality of buffers are linked to a receive message chain, which of said plurality of buffers are linked to a transmit message chain, and which of said plurality of buffers are linked to an idle message chain, said message queuing buffer control table also configured to store start link pointers and end link pointers for each of said plurality of buffers respectively linked to said receive message chain, said transmit message chain, and said idle message chain.

2. An on-line data processing system according to claim 1, wherein said storage means is comprised of a plurality of buffers.

3. An on-line data processing system according to claim 1, wherein said priority determination means determines the priority of said messages by using a character string in a predetermined location in each of said messages.

4. An on-line data processing system according to claim 1, wherein said priority determination means includes a priority definition table having priority definition data for determining the priority of said messages.

5. An on-line data processing system according to claim 4, wherein said priority determination means dynamically adds, changes, and deletes said data of the priority definition table by request from said processing means.

6. An on-line data processing system according to claim 1, wherein said traffic control means stores said message into said storage means and obtains said message from said storage means in order of priority as determined by said priority determination means.

7. An on-line data processing system according to claim 1, wherein said traffic control means discards said message having one of a predetermined priority and a priority less than said predetermined priority from said storage means according to a request from said processing means, said request including said predetermined priority.

8. An on-line data processing system according to claim 1, wherein said storage means comprises:

a link pointer section for storing a value used to link said plurality of buffers in a chain to provide queuing control;

a sent/received section for storing said messages and said resultant messages; and a priority section for storing a priority of said messages.

9. An on-line data processing system according to claim 1, wherein said traffic control means comprises:

a queuing buffer count section for storing a number corresponding to said plurality of buffers of said storage means, each of said plurality of buffers of said storage means being assigned to one of a transmission chain, a received chain and an idle chain;

an idle queuing buffer head pointer section for storing an idle start pointer corresponding to one of said plurality of buffers of said storage means that is linked to a starting position of said idle chain;

an idle queuing buffer end pointer section for storing an idle end pointer corresponding to one of said plurality of buffers of said storage means that is linked to an ending position of said idle chain;

an idle queuing buffer count section for storing a number corresponding to said plurality of buffers of said storage means that are linked to said idle chain;

a reception queuing buffer head pointer section for storing a reception start pointer corresponding to one of said plurality of buffers of said storage means that is linked to a starting position of said received chain;

a reception queuing buffer end pointer section for storing a reception end pointer corresponding to one of said plurality of buffers of said storage means that is linked to an ending position of said received chain;

a reception queuing buffer count section for storing a number corresponding to said plurality of buffers of said storage means that are linked to said received chain;

a transmission queuing buffer head pointer section for storing a transmission start pointer corresponding to one of said plurality of buffers of said storage means that is linked to a starting position of said transmission chain;

a transmission queuing buffer end pointer section for storing a transmission end pointer corresponding to one of said plurality of buffers of said storage means that is linked to an ending position of said transmission chain; and a transmission queuing buffer count section for storing a number corresponding to said plurality of buffers of said storage means that are linked to said transmission chain.

10. An on-line data processing system according to claim 1, wherein said plurality of buffers of said storage means are respectively assigned to a transmit queue, a receive queue, and an idle queue, said buffers assigned to said transmit queue holding said messages to be transmitted to said terminals, said buffers assigned to said receive queue holding said messages received from said terminal, and said buffers assigned to said idle queue not holding any of said messages, wherein each of said plurality of buffers in said transmit queue and said receive queue are assigned to said priority corresponding to said message stored therein, and wherein said traffic control means includes means for determining a reception enable condition, a reception inhibit condition, a transmission enable condition, and a transmission inhibit condition for said priority corresponding to said messages according to a number of said buffers assigned to said idle queue.

11. An on-line data processing system connected to a plurality of terminals via communication lines, comprising:

transmitting/receiving means for transmitting or receiving messages to or from said terminals in accordance with predetermined transmission control protocols;

processing means responsive to said messages received from one of said terminals for processing said messages and producing resultant messages to be sent back to said one of said terminals;

storage means for temporarily storing said messages communicated between said transmitting/receiving means and said processing means, said storage means comprising a plurality of buffers, each of said plurality of buffers including:

a link pointer section for storing a value used to link said plurality of buffers in a chain to provide queuing control;

a sent/received section for storing said messages and said resultant messages; and a priority section for storing a priority of said messages;

priority determination means for determining the priority of said messages and said resultant messages; and traffic control means responsive to a request from said transmitting/receiving means and/or said processing means for providing a traffic control of messages communicated between said transmitting/receiving means and said processing means by storing or obtaining said messages into or from said storage means in accordance with the priority of said messages determined by said priority determination means, said traffic control means comprising:

a queuing buffer count section for storing a number corresponding to said plurality of buffers of said storage means, each of said plurality of buffers of said storage means being assigned to one of a transmission chain, a received chain and an idle chain;

an idle queuing buffer head pointer section for storing an idle start pointer corresponding to one of said plurality of buffers of said storage means that is linked to a starting position of said idle chain;

an idle queuing buffer end pointer section for storing an idle end pointer corresponding to one of said plurality of buffers of said storage means that is linked to an ending position of said idle chain;

an idle queuing buffer count section for storing a number corresponding to said plurality of buffers of said storage means that are linked to said idle chain;

a reception queuing buffer head pointer section for storing a reception start pointer corresponding to one of said plurality of buffers of said storage means that is linked to a starting position of said received chain;

a reception queuing buffer end pointer section for storing a reception end pointer corresponding to one of said plurality of buffers of said storage means that is linked to an ending position of said received chain;

a reception queuing buffer count section for storing a number corresponding to said plurality of buffers of said storage means that are linked to said received chain;

a transmission queuing buffer head pointer section for storing a transmission start pointer corresponding to one of said plurality of buffers of said storage means that is linked to a starting position of said transmission chain;

a transmission queuing buffer end pointer section for storing a transmission end pointer corresponding to one of said plurality of buffers of said storage means that is linked to an ending position of said transmission chain; and a transmission queuing buffer count section for storing a number corresponding to said plurality of buffers of said storage means that are linked to said transmission chain.

12. An on-line data processing system according to claim 11, wherein said traffic control means includes a queuing buffer traffic control area, which comprises:

a priority section for storing a priority level assigned to each of said plurality of buffers of said storage means;

a reception inhibition releasing section for storing a reception inhibition releasing value;

a reception inhibition starting section for storing a reception inhibition starting value;

a transmission inhibition releasing section for storing a transmission inhibition releasing value; and a transmission inhibition starting section for storing a transmission inhibition starting value, wherein when said idle start pointer stored in said idle queuing buffer head pointer section is equal to or less than said reception inhibition starting value, said traffic control means inhibits reception of any of said messages into said storage means, and when said idle start pointer stored in said idle queuing buffer head pointer section is equal to or greater than said reception inhibition releasing value, said traffic control means enables reception of any of said messages into said storage means, and when said idle start pointer stored in said idle queuing buffer head pointer section is equal to or less than said transmission inhibition starting value, said traffic control means inhibits transmission of any of said messages from said storage means, and when said idle start pointer stored in said idle queuing buffer head pointer section is equal to or greater than said transmission inhibition releasing value, said traffic control means enables transmission of any of said message from said storage means, and wherein said reception inhibition starting value is greater than said reception inhibition releasing value, said reception inhibition releasing value is greater than said transmission inhibition starting value, and said transmission inhibition starting value is greater than transmission inhibition releasing value.

13. An on-line data processing system according to claim 11, wherein said priority determination means determines the priority of said messages by using a character string in a predetermined location in each of said messages.

14. An on-line data processing system according to claim 11, wherein said priority determination means includes a priority definition table having priority definition data for determining the priority of said messages.

15. An on-line data processing system according to claim 14, wherein said priority determination means dynamically adds, changes, and deletes the data of said priority definition table by request from said processing means.

16. An on-line data processing system according to claim 11, wherein said traffic control means stores said message into said storage means and obtains said message from said storage means in order of priority as determined by said priority determination means.

17. An on-line data processing system according to claim 11, wherein said traffic control means discards said message having one of a predetermined priority and a priority less than said predetermined priority from said storage means according to a request from said processing means, said request including said predetermined priority.

18. An on-line data processing system according to claim 14, wherein said priority definition data includes:

a key starting position field to indicate a starting position of a key word character string that is indicative of the priority of one of said messages;

a key length field for storing a length of the key word character string;

a key word name field for storing the key word character string; and a priority field for storing a priority level corresponding to said key word character string.

19. An on-line data processing system for transmitting a received message from one of a plurality of terminals to another of said plurality of terminals, comprising:

a plurality of memory elements, each of said plurality of memory elements being used to temporarily store messages, said plurality of memory elements being assigned to a priority level corresponding to a message stored therein;

priority determination means for determining the priority level corresponding to said received message; and traffic control means for providing a traffic control of said received message and for determining whether to store said received message into an available one of said plurality of memory elements based on the priority level of said received message and a number of said memory elements available for storing said received message, said traffic control means including a message queuing buffer control table configured to store information related to which of said plurality of memory elements are linked to a receive message chain, which of said plurality of memory elements are linked to a transmit message chain, and which of said plurality of memory elements are linked to an idle message chain, said message queuing buffer control table also configured to store start link pointers and end link pointers for each of said plurality of buffers respectively linked to said receive message chain, said transmit message chain, and said idle message chain.

* * * * *